July 26, 1960     B. E. NILSSON     2,946,071
LIFTING AND CARRYING HANDLE FOR DOMESTIC APPLIANCE
Filed March 25, 1957
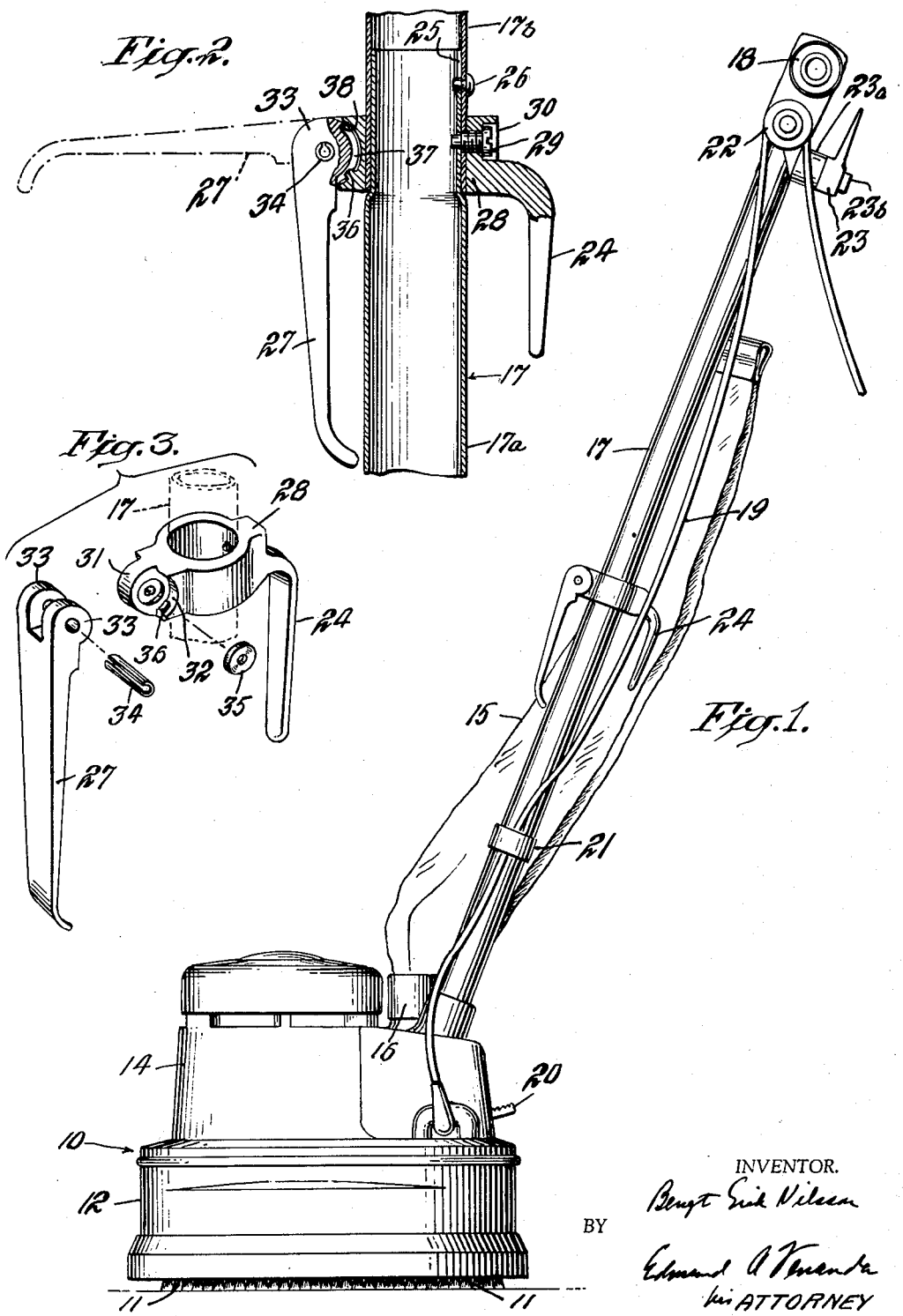
INVENTOR.
Bengt Erik Nilsson
BY
his ATTORNEY

2,946,071
LIFTING AND CARRYING HANDLE FOR DOMESTIC APPLIANCE

Bengt Erik Nilsson, Hagersten, Sweden, assignor to Aktiebolaget Electrolux, Stockholm, Sweden, a corporation of Sweden Filed Mar. 25, 1957, Ser. No. 648,273

Claims priority, application Sweden Mar. 29, 1956

1 Claim. (Cl. 15—49)

My invention relates to domestic appliances of the kind having structure adapted to be positioned on a surface and manipulated thereover with the aid of an elongated rod mounted thereon.

It is an object of my invention to provide for domestic appliances of this kind improved lifting and carrying provisions embodying a carrying handle which is mounted on the elongated rod at a region between the structure to which the rod is connected and the manipulating handle for the appliance at the outer free end of the rod.

The invention, together with the above and other objects and advantages thereof, will become apparent from the following description, and the features of novelty which characterize the invention will be pointed out with particularity in the claim annexed to and forming a part of this specification.

For a better understanding of the invention, reference may be had to the following description taken in connection with the accompanying drawing, in which:

Fig. 1 is a side elevation of a domestic appliance embodying the invention;

Fig. 2 is an enlarged fragmentary view, partly in section, to illustrate more clearly parts of the domestic appliance shown in Fig. 1; and Fig. 3 is a perspective view of the parts shown in Fig. 2 separated from one another to illustrate details more clearly.

Referring to the drawing, I have shown my invention in connection with a domestic appliance 10 having rotatable brushes 11 projecting downwardly beneath a base 12 and arranged to be driven by an electric motor housed in an upright casing 14 positioned over an opening in the base. During operation of the domestic appliance 10, air may be drawn into the interior of the base 12 at the underside thereof by a fan unit which is also driven by the electric motor. Dust and dirt entrained in the air are separated from the air when the latter passes through a cloth filter bag 15 which is connected at 16 to the casing 14 at its lower inlet end and is carried at its upper end in any well-known manner (not shown) at the top part of a rod or elongated member 17. In order to simplify the drawing, the electric motor, fan unit, shafts upon which the brushes are mounted and driving connections therebetween have not been shown, their illustration not being necessary for an understanding of my invention.

The domestic appliance 10, which may be referred to as a combination floor polisher and vacuum cleaner, is adapted to be manipulated by a handle 18 which is connected to the outer free end of the elongated member 17, the lower end of which is pivotally connected in any suitable manner to the base 12 at the rear part thereof. The electrical circuit for the motor includes an electrical cord 19 and a switch which is disposed within the casing 14 and adapted to be controlled by a foot-operated member 20 extending rearwardly therefrom. The electrical cord 20 extends upwardly from the casing 14 and is fixed to the elongated member 17 at 21 and 22, respectively. A pair of spaced apart members 23 and 24 are provided on the elongated member 17 so that the part of the electrical cord 20 extending from the upper part of the member to the connecting plug at the outer free end thereof may be wound or looped about the members 23 and 24 when the domestic appliance 10 is not in use. The upper member 23 is frictionally held against a fitting 23a by a pin 23b and may be turned sideways or laterally from the position shown in Fig. 1 to facilitate quick removal of the electrical cord 20 from around the hook-like members 23 and 24.

As shown in Fig. 2, the elongated member 17 is formed of two pipe sections 17a and 17b which fit telescopically one within the other. The section 17a at its outer end is formed with a slot 25 which receives a pin 26 fixed in position, as by riveting, on the section 17b, whereby the sections are located relative to one another when telescopically connected together.

In accordance with my invention, a handle 27 is provided on the elongated member 17 for lifting and carrying the appliance 10, which is pivotally connected to a ring-shaped member 28 secured to the elongated member 17 and formed integrally with the member 24. The ring-shaped member 28 fits snugly over the pipe section 17b and is secured in place by a locking screw 29 which passes through openings in both pipe sections to lock them together, the head of the screw being disposed in a recessed portion 30 of the ring-shaped member 28.

The side of the ring-shaped member 28 diametrically opposite the member 24 is formed with an apertured ear 31, at each side of which are provided arcuate-shaped bearing surfaces 32. The handle 27 is formed with bifurcated apertured lobes 33 which bear against opposing faces of the ear 31 and ride in the bearing surfaces 32, the ear 31 and lobes 33 being pivotally connected to one another by a pin 34 which is resilient in character and formed from a metallic sheet or the like bent to form a hollow split sleeve. A washer 35 which is resilient in character and of dished form is provided on the pin 34 between the ear 31 and one of the lobes 33 to produce sufficient friction to maintain the handle 27 in any position to which it is moved.

At opposing faces of the ear 31 are provided small lugs 36, as shown in Figs. 2 and 3. Each of the lobes 33 is notched, as indicated at 37 in Fig. 2, whereby the handle 27 can be moved from the solid to the dotted line positions illustrated in Fig. 1. When the handle 27 is being moved from the solid to the dotted line position in Fig. 2, the shoulders 38 on the lobes 33, at one end of the notches 37, move toward the lugs 36; and, when the handle 27 reaches the dotted line position in Fig. 2, the lugs 36 engage the shoulders 38 and stop the upward movement being imparted to the handle.

When the domestic appliance 10 is being used or stored in an erect position, the handle 27 desirably is moved to the solid line position shown in Figs. 1 and 2. When it is desired to move the appliance from one place to another, the handle can be easily moved to the dotted line position shown in Fig. 2 and conveniently employed to lift and hold the appliance in a raised position. Since the carrying handle is positioned on the elongated member 17 between the base 12 and the manipulating handle 18, the appliance can be conveniently balanced when being carried by the lifting and carrying handle 27.

Although I have shown my improved lifting and carrying handle in connection with a combination floor polisher and vacuum cleaner, I do not desire my invention to be limited to the particular arrangement set forth, and I intend in the claims to cover all modifications which do not depart from the spirit and scope of my invention.

What is claimed is:

A motor-driven appliance of the class described having structure adapted to be positioned on a surface and be moved thereover and an electrical cord for connecting the appliance to a source of electrical supply, an elongated rod comprising first and second pipe sections having apertured ends which telescopically fit one within the other, said first pipe section being pivotally mounted on said structure, means providing a hand grip at the outer free end of said second pipe section for controlling the appliance and manipulating said structure about the surface, said rod being angularly movable on the structure and inclined upwardly and rearwardly therefrom during normal operation of the appliance, a mounting bracket having an apertured collar encircling said rod at the telescopically fitted ends of said pipe sections, means including a part which is received by the apertures in said collar and said pipe sections for attaching said bracket to said rod and connecting said pipe sections to one another at the telescopically fitted ends thereof, a carrying handle, means pivotally mounting said handle on said bracket for angular movement in a plane which passes through said rod and is perpendicular to the surface upon which said structure is adapted to be positioned, said handle being movable between a first position closely adjacent to and alongside said rod to a second position substantially perpendicular to said rod and extending forwardly from said rod toward the front of said structure, said pivotal mounting means including provisions for holding said carrying handle at said second position when moved thereto from said first position, a pair of elements on said rod and about which the electrical cord is adapted to be wound, said elements being disposed in said plane and extending rearwardly from said rod and said structure in a direction diametrically opposite from that of said carrying handle in its second position, one of said elements being fixed to said second pipe section at a region thereof which is nearer to said hand grip than to said collar, and said other element being carried by said bracket.

References Cited in the file of this patent

UNITED STATES PATENTS

| | | |
|---|---|---|
| Re. 15,627 | Clements | June 12, 1923 |
| 1,090,129 | Barnes | Mar. 17, 1914 |
| 1,493,309 | Wilson | May 6, 1924 |
| 1,918,713 | Ponselle | July 18, 1933 |
| 2,037,668 | Smith et al. | Apr. 14, 1936 |
| 2,290,336 | Kirby | July 21, 1942 |
| 2,842,788 | Rench et al. | July 15, 1958 |

FOREIGN PATENTS

| | | |
|---|---|---|
| 125,309 | Sweden | June 28, 1949 |
| 126,553 | Switzerland | June 16, 1928 |
| 521,215 | Canada | Jan. 31, 1956 |